United States Patent
Montie et al.

(10) Patent No.: US 8,486,178 B2
(45) Date of Patent: Jul. 16, 2013

(54) CROSS-PLEATED MEMBRANE CARTRIDGES, AND METHOD AND APPARATUS FOR MAKING CROSS-PLEATED MEMBRANE CARTRIDGES

(75) Inventors: Greg Montie, Surrey (CA); James Franklin Dean, West Vancouver (CA); Curtis Mullen, Vancouver (CA); Robert Hill, Surrey (CA)

(73) Assignee: DPoint Technologies Inc., Vancouver, British Columbia (CA)

( * ) Notice: Subject to any disclaimer, the term of this patent is extended or adjusted under 35 U.S.C. 154(b) by 0 days.

(21) Appl. No.: 13/417,726

(22) Filed: Mar. 12, 2012

(65) Prior Publication Data

US 2012/0193820 A1   Aug. 2, 2012

Related U.S. Application Data

(62) Division of application No. 12/318,973, filed on Jan. 14, 2009, now Pat. No. 8,157,891.

(60) Provisional application No. 61/006,442, filed on Jan. 14, 2008.

(51) Int. Cl.
  *B01D 53/22* (2006.01)
(52) U.S. Cl.
  USPC .......... 95/43; 55/521; 95/52; 96/11; 165/165; 165/166; 165/167
(58) Field of Classification Search
  USPC .. 95/45, 52, 43; 96/11; 165/165–167; 55/521
  See application file for complete search history.

(56) References Cited

U.S. PATENT DOCUMENTS

| 2,681,155 | A | | 6/1954 | Graham | |
|---|---|---|---|---|---|
| 2,747,744 | A | | 5/1956 | Gretzinger | |
| 3,071,187 | A | * | 1/1963 | Fairbanks | 165/170 |
| 3,241,607 | A | * | 3/1966 | Rutledge | 165/166 |
| 3,262,496 | A | * | 7/1966 | Bawabe | 165/166 |
| 3,537,165 | A | * | 11/1970 | Kemp et al. | 29/890.039 |

(Continued)

FOREIGN PATENT DOCUMENTS

| GB | 2028774 | 3/1980 |
|---|---|---|
| WO | 96/35911 | 11/1996 |
| WO | 2007/054952 | 5/2007 |

OTHER PUBLICATIONS

Heidelberg, "Stahlfolder TH/KH The New Dimension of Professional Folding" (2004) Technical Publication 4-39.

*Primary Examiner* — Jason M Greene
*Assistant Examiner* — Anthony Shumate
(74) *Attorney, Agent, or Firm* — Clark & Brody

(57) ABSTRACT

A membrane cartridge is manufactured by repeatedly folding and joining two strips of membrane to form a cross-pleated cartridge with a stack of openings or fluid passageways configured in an alternating cross-flow arrangement. The cartridge can be modified for other flow configurations including co-flow and counter-flow arrangements. Methods for manufacturing such cross-pleated membrane cartridges, as well as apparatus used in the manufacturing process are described. Cross-pleated membrane cartridges comprising water-permeable membranes can be used in a variety of applications, including in heat and water vapor exchangers. In particular they can be incorporated into energy recovery ventilators (ERVs) for exchanging heat and water vapor between air streams being directed into and out of buildings.

35 Claims, 10 Drawing Sheets

U.S. PATENT DOCUMENTS

| | | |
|---|---|---|
| 3,585,131 A | 6/1971 | Esmond |
| 3,982,981 A * | 9/1976 | Takao et al. ............... 156/89.22 |
| 4,040,804 A | 8/1977 | Harrison |
| 4,460,388 A * | 7/1984 | Fukami et al. ............... 55/521 |
| 4,557,321 A * | 12/1985 | von Resch ............... 165/122 |
| 4,609,039 A * | 9/1986 | Fushiki et al. ............... 96/126 |
| 4,616,695 A * | 10/1986 | Takahashi et al. ............... 165/54 |
| 4,915,469 A * | 4/1990 | Byron et al. ............... 385/46 |
| 6,077,436 A | 6/2000 | Rajnik et al. |
| 6,612,365 B1 | 9/2003 | Saishu et al. |
| 7,115,089 B2 | 10/2006 | Basily et al. |
| 7,168,482 B2 | 1/2007 | Lee et al. |
| 7,217,309 B2 | 5/2007 | Colamussi |
| 7,331,376 B2 | 2/2008 | Gagnon et al. |
| 2003/0121845 A1 | 7/2003 | Wagner et al. |
| 2004/0226685 A1 | 11/2004 | Gagnon et al. |
| 2005/0077229 A1 | 4/2005 | Ishii |
| 2008/0085437 A1 | 4/2008 | Dean et al. |
| 2009/0193974 A1 | 8/2009 | Montie et al. |

* cited by examiner

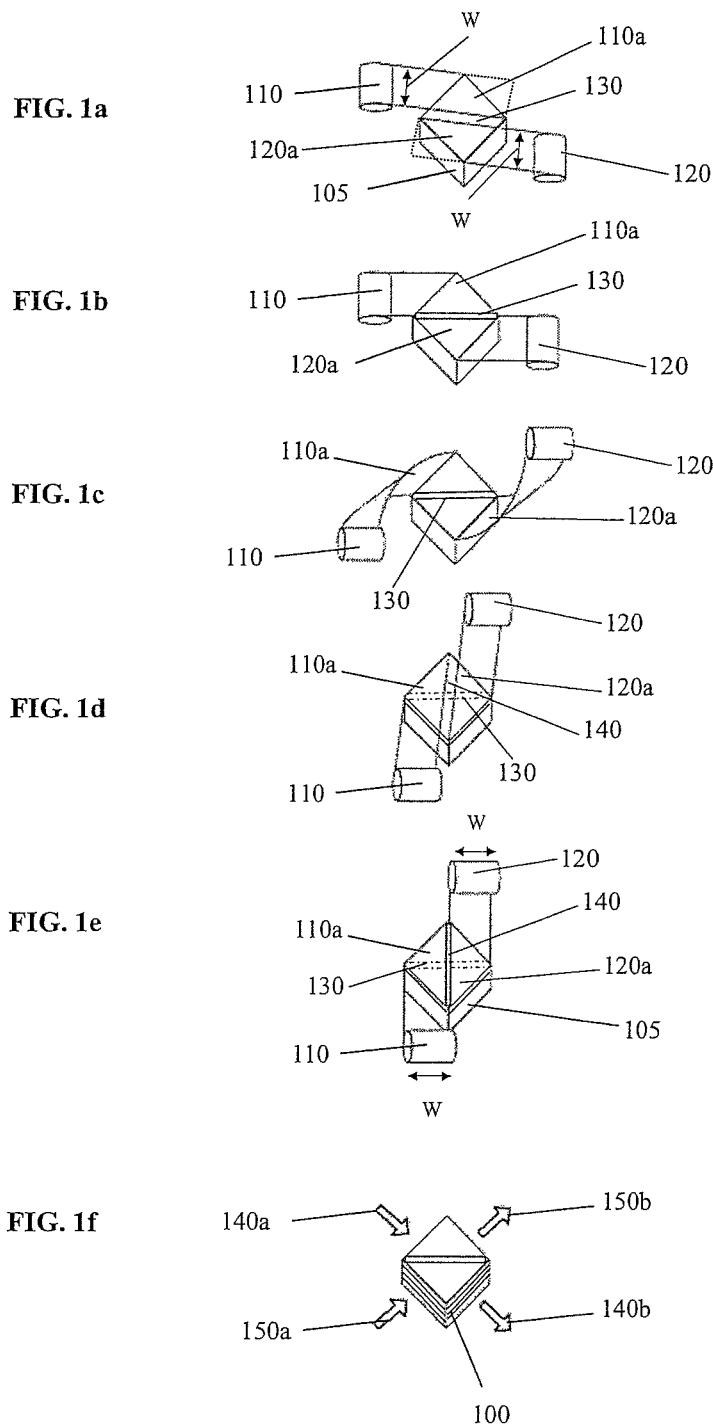

CROSS-PLEATED MEMBRANE CARTRIDGES, AND METHOD AND APPARATUS FOR MAKING CROSS-PLEATED MEMBRANE CARTRIDGES

CROSS-REFERENCE TO RELATED APPLICATIONS

This application is a divisional application of Ser. No. 12/318,973, filed on Jan. 14, 2009, now U.S. Pat. No. 8,157,891, which claims benefit of priority under 35 USC §119(e) based on U.S. Provisional Patent Application Ser. No. 61/006442, entitled "Cross-Pleated Heat and Humidity Exchanger", filed on Jan. 14, 2008, which is hereby incorporated by reference in its entirety.

FIELD OF THE INVENTION

The present invention relates to cross-pleated membrane cartridges. More particularly the invention relates to cartridges in which the membrane is folded in a particular manner. The invention includes a method for manufacturing such cross-pleated membrane cartridges, as well as apparatus that can be used in the manufacturing method. The cartridges are useful in heat and water vapor exchangers and in other applications.

BACKGROUND

Heat and water vapor exchangers (also sometimes referred to as humidifiers) have been developed for a variety of applications, including building ventilation (HVAC), medical and respiratory applications, gas drying, and more recently for the humidification of fuel cell reactants for, electrical power generation. Many such devices involve the use of a water-permeable membrane via which water vapor and, provided there is a temperature differential across the membrane, heat is transferred between fluid streams flowing on opposite sides of the membrane.

Planar plate-type heat and water vapor exchangers use membrane plates that are constructed using discrete pieces of a planar, water-permeable membrane (for example, Nafion®, cellulose, polymers or other synthetic or natural membranes) supported by a separator material and/or frame. The membrane plates are typically stacked, sealed and configured to accommodate fluid streams flowing in either cross-flow or counter-flow configurations between alternate plate pairs, so that heat and water vapor is transferred via the membrane, while limiting the cross-over or cross-contamination of the fluid streams.

A heat recovery ventilator (HRV) is a mechanical device that incorporates a heat exchanger with a ventilation system for providing controlled ventilation into a building. The heat exchanger heats or cools the incoming fresh air using the exhaust air. Devices that exchange moisture in addition to heat between the two air streams are generally referred to as Energy Recovery Ventilators (ERVs), sometimes also referred to as Enthalpy Recovery Ventilators. Two primary reasons to install an ERV are increased energy savings and improved indoor air quality. ERV systems typically comprise a sheet metal enclosure, fans to move the air streams, ducting, as well as filters, control electronics and other components. The key component in the ERV which transfers the heat and water vapor between the air streams is called the ERV core. Often ERV cores are constructed like the planar plate-type heat and water vapor exchangers described above.

A benefit of planar plate-type heat and water vapor exchanger designs for ERV and other applications, is that they are readily scalable. The quantity as well as the dimensions of the modular membrane plates can be adjusted for different end-use applications. However, with plate-type planar exchangers there are a large number of joints and edges that need to be sealed. As a result, such devices can be labor intensive and expensive to manufacture. Also their durability can be limited, with potential delamination of the membrane from the frame and failure of the seals resulting in leaks, poor performance and cross-over contamination (leakage between streams).

In other heat and water vapor exchanger designs, the many separate membrane plates are replaced by a single membrane cartridge made by folding a continuous strip of membrane in a concertina, zig-zig or accordion-fashion, with a series of parallel alternating folds. Similarly, for heat exchangers, a continuous strip of material can be patterned with fold lines and folded along such lines to arrive at a configuration appropriate for heat exchange. By folding the membrane in this way, the number of edges that must be bonded can be greatly reduced. For example, instead of having to bond two edges per layers, it may be necessary only to bond one edge per layer because the other edge is a folded edge. However, the flow configurations that are achievable with concertina-style pleated membrane cartridges are limited, and there is still typically a need for some edge sealing. Another disadvantage is the higher pressure drop as a result of the often smaller size of the entrance and exit areas to the pleated cartridge.

SUMMARY OF THE INVENTION

The present approach provides a uniquely cross-pleated membrane cartridge that provides a stack or layered array of openings or fluid passageways, and that utilizes membrane folds for edge sealing. In preferred embodiments, the cross-pleated membrane cartridge is manufactured using two lengths or strips of membrane. Each membrane strip undergoes a repeated folding process, incorporating also a step to join the two strips of membrane across the diagonal of the layer. The resultant passageways are configured in an alternating cross-flow arrangement. The cartridge can be made or can be readily modified for other flow configurations including co-flow and counter-flow arrangements as described in more detail below.

In particular, a method for making a cross-pleated cartridge having a plurality of membrane layers comprises positioning two strips of membrane, extending in substantially opposite directions edge-to-edge, generally in the same plane. The strips are positioned so that a portion of one edge of one of the membrane strips is adjacent and substantially parallel to a portion of one edge of the other membrane strip, forming a first seam. The adjacent edge portions of the membrane strips are joined along the first seam to form one of the membrane layers in the cartridge. Each membrane strip is then folded at a 45° angle towards and then overlaying the first seam, to form a second seam, again between adjacent edge portions of the membrane strips. The second seam is oriented at 90° to the first seam. The adjacent edge portions of the membrane strips are joined along the second seam to form another membrane layer of the cartridge. Again each membrane strip is then folded at a 45° angle towards and then overlaying the second seam, to form another first seam oriented at 90° to the second seam in the preceding layer. The joining and folding steps are repeated to form a cross-pleated cartridge with a stack or layered array of passageways between the membrane layers.

The membrane folds define a pair of parallel walls for each passageway, so that each passageway is sealed by a fold along two edges.

The resultant cross-pleated cartridge can be a square-based rectangular prism, wherein the membrane layers are substantially square with the area (A) of the square being dependent upon the width (W) of the membrane strips, where $A=2W^2$. Each of the first and second seams forms a diagonal of one of the substantially square membrane layers, where each of the first and second seams will be about 2 W in length. The number of folds can be varied to give cartridges with the desired number of layers.

In embodiments of the present method, adjacent portions of the membrane strips can be positioned so that they abut one another, or so that they slightly overlap, along the seams. They can be joined by various methods including: applying adhesive tape, or adhesively or thermally bonding or welding the edges of the membrane together along the seams.

A method for making a cross-pleated cartridge can further comprise trimming or cutting a square-based cartridge, formed as described above, to give a finished cartridge with a different three-dimensional shape. For example, the method can comprise cutting through the plurality of membrane layers to form a hexagonal prism-shaped cartridge.

Each of the membrane layers in the cross-pleated cartridge will have a number of corners (the number of corners will depend upon whether and how the cartridge is trimmed). A method for making a cross-pleated cartridge can further comprise applying a sealant material at the corners of each of the membrane layers. For example, the sealing step can comprise potting the layered-edges (edges that are perpendicular to the membrane layers) of the cartridge with a sealant material. In embodiments where the cross-pleated cartridge is trimmed, the sealing step can further comprise potting some of the layered-faces of the cartridge with a sealant material.

A method for making a cross-pleated cartridge can further comprise inserting a separator between at least some of the plurality of membrane layers. This can be done during the cross-pleating process, or separators can be inserted into passageways of the cartridge once the cartridge is formed. In some embodiments the separator is used to define a plurality of discrete fluid flow channels within the passageway, for example, to enhance the flow of fluid streams across opposing surfaces of the membrane. Separators can also be used to provide support to the membrane, and/or to provide more uniform spacing of the layers.

The present invention encompasses cross-pleated membrane cartridges that are obtained or are obtainable using embodiments of the methods described herein.

Cross-pleated membrane cartridges comprise multiple layers of folded membrane that define a stack or layered array of fluid passageways. Each layer comprises a portion of at least two strips of membrane joined edge-to-edge to faun at least one seam. Each of the passageways comprises two parallel edges that are sealed by the folded membrane. The seams in adjacent membrane layers of the cartridge are oriented at 90° to one another.

In some embodiments, each layer comprises a portion of two strips of membrane joined edge-to-edge to form a seam. In this case the cross-pleated cartridge is initially formed as a square-based rectangular prism, wherein the membrane layers are substantially square, and each of the seams forms a diagonal of one of the square membrane layers. Adjacent fluid passageways in the cartridge are oriented at 90° to one another.

In other embodiments the cross-pleated cartridge is a different three-dimensional shape. This can be achieved, for example, by using more than two strips of membrane in a similar cross-pleating process, or by cutting or trimming a square-based rectangular prism-shaped cartridge.

As mentioned in reference to the method described above, the membrane strips can abut one another or can overlap along the seams. They can be joined by various types of bond, for example, adhesive tape, or a thermal weld or an adhesive bond.

The cross-pleated membrane cartridge preferably further comprises seals extending along the layered-edges of the cartridges. In some embodiments, the cross-pleated membrane cartridge further comprises seals covering one or more of the layered-faces of the cartridge.

In some embodiments, the cross-pleated cartridge comprises separators disposed between at least some of the plurality of membrane layers. The separators can be of various types, including corrugated sheet materials, mesh materials, and molded plastic inserts.

Cross-pleated membrane cartridges can be used in a variety of applications, including in heat and water vapor exchangers. The cartridges are particularly suitable for use as cores in energy recovery ventilator (ERV) applications. They can also be used in heat recovery ventilator (HRV) applications, air filter applications, gas dryer applications, flue gas energy recovery applications, sequestering applications, gas/liquid separator applications, and fuel cell applications. Whatever the application, the cartridge is typically disposed within some kind of housing.

An embodiment of a heat and water vapor exchanger, for transferring heat and water vapor between a first fluid stream and a second fluid stream, comprises a housing with a first inlet port, a first outlet port, a second inlet port and a second outlet port. A cross-pleated cartridge is enclosed within the housing. The cross-pleated cartridge comprises multiple layers of a folded water-permeable membrane material defining a stack of alternating first and second fluid passageways. Each layer of the cartridge comprises a portion of each of two strips of the water-permeable membrane material joined by a seam. The first fluid passageways fluidly connect the first inlet port to the first outlet port, and the second fluid passageways fluidly connect the second inlet port to the second outlet port. The two streams are preferably fluidly isolated from each other in the exchanger.

Cross-pleated cartridges of the type described herein can be made using a continuous manufacturing process which can be partially or fully automated. Preferably the equipment utilizes one or more rotating components to facilitate the cross-pleating process.

For example, a manufacturing equipment assembly for making a cross-pleated membrane cartridge comprises: a frame including a height-adjustable plate with an upper working surface; a pair of membrane spools from which two strips of membrane can be drawn edge-to-edge in substantially opposite directions across the upper working surface of the plate; and a seam bonding mechanism for joining adjacent edge portions of the two strips of membrane on the upper working surface of the plate to form a membrane layer. In some embodiments, each of the frame, the height-adjustable plate and the membrane spools are rotatable. The assembly can be configured so that the rotatable frame and height-adjustable plate rotate through 90° (about an axis perpendicular to the centre of the height-adjustable plate) after each membrane layer is formed. The assembly can be further configured so that the membrane spools rotate through 180° after each membrane layer is formed. The assembly can be configured so that the membrane spools rotate through 180° simultaneously with the 90° rotation of the rotatable frame and height-adjustable plate.

BRIEF DESCRIPTION OF THE DRAWINGS

FIGS. 1a-f show a series of simplified schematic diagrams illustrating steps in a cross-pleating technique that can be used to make a cross-pleated membrane cartridge, such as an ERV core.

FIG. 2a illustrates a square-base cross-flow cartridge and FIG. 2b illustrates a hexagonal cartridge.

FIG. 3a illustrates a square-base cross-flow cartridge with corrugated separators and FIG. 3b illustrates a counter-flow hexagonal cartridge with molded plastic inserts.

FIG. 5a illustrates a membrane that has diagonal ribbing on both sides; FIG. 5b illustrates a membrane that has a polka dot feature on both sides; and FIG. 5b illustrates a membrane that has elongated protrusions on both sides.

DETAILED DESCRIPTION OF THE INVENTION

Figure 2A:
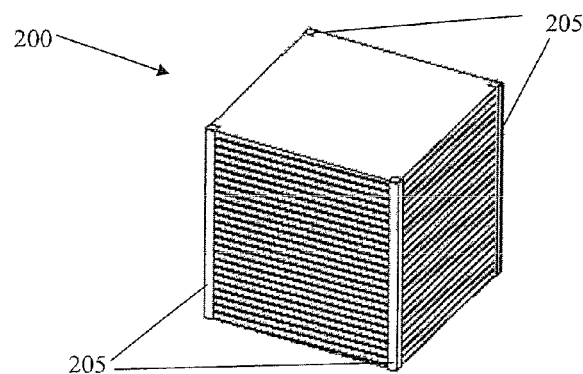
FIGS. 2a-b show embodiments of finished cross-pleated cartridges. Specifically.

Cross-pleated cartridges of the type described herein have enhanced sealing characteristics. The particular folding configuration is advantageous in that it reduces the number of edges that have to be sealed, especially relative to plate-type heat and water vapor exchangers where individual pieces of membrane are stacked and have to be sealed along two edges, and even relative to pleated membrane devices with accordion-type pleated membrane cartridges. To a large extent, cross-pleated cartridges rely on the membrane folds (that occur along opposite edges of each layer) to seal and separate the fluid flows in adjacent streams. Thus, the overall number of seals, "seal area" or "seal length" tends to be lower. As a result, the tendency for leakage and cross-contamination of the process streams is greatly reduced. ERV cores comprising cross-pleated cartridges of the type described herein have given superior results in pressurized crossover leak-testing, relative to conventional planar plate-type core designs.

FIGS. 1a-f show a series of simplified schematic diagrams illustrating steps in a cross-pleating technique that can be used to make a cross-pleated membrane cartridge 100, such as an ERV core. In FIG. 1a two strips of membrane 110a and 120a are drawn in substantially opposite directions from two reels of membrane, 110 and 120, respectively. Membrane strips 110a and 120a are arranged edge-to-edge in the same plane on the top surface of a base frame or platform 105. The resultant seam 130 forms the diagonal of a square, as shown in FIG. 1b. If the membrane strips are of width W as shown, the length of seam 130 is approximately 2 W, and the area of the square is approximately 2 $W^2$. The edges of membrane strips 110a and 120a are joined together along seam 130. For the first layer of the cartridge, a triangular piece (as indicated by the dotted lines in FIG. 1a) is removed from the end of each membrane strip, by trimming the strip at a 45° angle, to form a square base layer for the cartridge. In the next step, shown in FIGS. 1c-e, each membrane strip 110a and 120a is then folded, at an angle of 45° to its edge, towards seam 130 and over top of the square to faun another diagonal seam 140 oriented at 90° to seam 130 in the previous layer. The membrane strips are similarly joined along this seam 140. The folding and joining process (shown in FIGS. 1a-e) is then repeated to give the desired number of layers in membrane cartridge 100. For the last layer of the cartridge, the end of each membrane strip is again trimmed at 45° to form the square top surface of the cartridge. The resulting cross-pleated membrane cartridge has layered alternating openings or passageways oriented at 90° to one another; each opening extends from one side face through to the opposite side face. A first fluid can be supplied to one face of the cartridge and will pass through the layered passageways exiting at the opposite face as indicated by arrows 140a and 140b in FIG. 1f. A second fluid can be supplied to an adjacent face of the cartridge and will pass through alternately layered passageways, exiting at the opposite face as indicated by arrows 150a and 150b in FIG. 1f. This allows for a cross-flow configuration of two different fluids through alternating layers of the cartridge.

Such cartridges can be made in a wide variety of sizes, and the height of the finished cartridge will depend on the number of folded layers, as well as the thickness of the membrane and separator (if any) in each layer. For example, cross-pleated cartridges have been made for ERV applications where the dimensions of the square range from 8"×8" to 3'×3', and the number of layers is 100-200.

Various methods can be used to join the two strips of membrane along the diagonal seams (for example, 130 and 140 in FIG. 1b and 1e) in each layer of the cross-pleated cartridge. For example, the membrane strips can be joined together using a suitable adhesive tape, selected depending on the nature of the membrane and/or the end-use application for the cartridge. For example, ½"-1" wide polypropylene tape has been used successfully with water-permeable polymer membranes for ERV applications. If adhesive tape is used, the membrane edges preferably abut (edge-to-edge), although they can overlap slightly along each diagonal seam. Adhesive tape can be placed along the seam contacting each membrane strip and forming a seal. Preferably the tape is wide enough to adequately cover the seam and accommodate variability in the manufacturing process, without obscuring too much of the membrane surface. Depending on the properties of the membrane, in some cases the edges can instead be thermally bonded or vibration welded together along the diagonal seams. Another option is to adhesively bond the membrane strips together along their adjoining edges, using a suitable adhesive or bonding agent. For example, a liquid one- or two-part bonding agent can be applied to one or both of the membrane surfaces along each of the diagonal seams. For thermal bonding, vibration welding or adhesive bonding, preferably the membrane roll width is slightly oversized so that the membrane edges can be overlapped slightly along the diagonal seams. Whatever method is used to join the membrane strips along the diagonal seams, preferably it forms a good seal so that fluids do not pass between layers via a breach or leak in the seam, causing undesirable mixing or cross-contamination of the process streams in the particular end-use application of the cartridge.

Figure 2B:
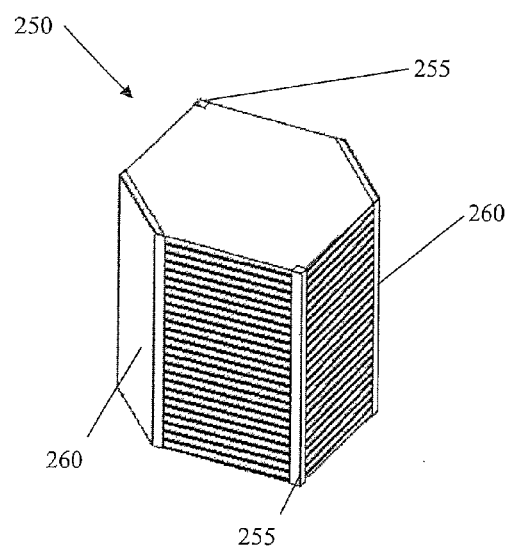
Figure 2C:
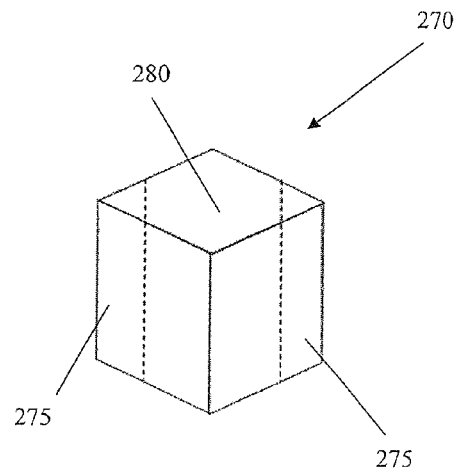
FIG. 2c shows how a square-base cartridge can be cut to form a hexagonal cartridge.

A square-based cross-pleated cartridge made using the technique described above can be cut to form different prismatic shapes, polyhedra, or other three-dimensional shapes, depending on the end-use application, desired flow configuration and packaging. FIGS. 2a and 2b show embodiments of finished cross-pleated cartridges. Specifically, FIG. 2a illustrates a square-base cross-flow cartridge 200, and FIG. 2b illustrates a cartridge 250 that is a hexagonal prismatic shape with six-sided membrane layers. FIG. 2c shows how a square-base cartridge 270, similar to that shown in FIG. 2a can be cut or sliced (along the dotted lines, removing two triangular prism-shaped pieces 275) to form a hexagonal cartridge 280, similar to that shown in FIG. 2b.

In preferred embodiments, a cross-pleated cartridge is provided with seals along its "layered-edges" (at the corners of each folded layer). In one approach these seals are formed by "potting" the layered-edges to form a seal between adjacent faces of the cartridge. The potted edge seals close off the holes created at the corners produced by the cross-pleat process, and can also provide a framework by which the cartridge is held together. In FIGS. 2a and 2b the layered-edges are the vertical edges of the cartridges. Cross-pleated cartridge 200 in FIG. 2a has four potted layered-edge seals 205. Hexagonal cartridge 250 in FIG. 2b has two potted layered-edge seals 255 and two layered-face seals 260 that cover and block the openings on the two cut faces of hexagonal cartridge 250. The seals can be formed using a suitable material, for example, a two-part rubber epoxy material can be used.

Cross-pleated cartridges with different three-dimensional shapes can also be formed by using more than two strips of membrane in a cross-pleating process. Although this can increase the complexity of the cross-pleating process, this approach can result in less material wastage relative to trimming a square-based cartridge to a different shape. For example, a hexagonal cartridge having a plurality of membrane layers can be made by positioning two strips of membrane, extending in substantially opposite directions edge-to-edge, generally in the same plane. The strips are positioned so that a portion of one edge of one of the membrane strips is adjacent and substantially parallel to a portion of one edge of the other membrane strip, forming a first seam. The adjacent edge portions of the membrane strips are joined along the first seam to form a two-piece membrane layer. A third strip of membrane can then be positioned across the two-piece membrane layer at 90° to the first seam. Each of the original two membrane strips is then folded on a 45° angle, towards and then overlaying opposite end portions of first seam, so that the two membrane strips are aligned along opposite edges of the third membrane strip. This finals a pair of second seams at 90° to the first seam. The edge portions of the third membrane strip are joined to edge portions of each of the other two membrane strips along the second seams to form a three-piece membrane layer. Each of the original two membrane strips is then folded at a 45° angle towards and then overlaying the second seams, to form another first seam oriented at 90° to the second seam in the preceding layer. The two strips are again joined to form another two-piece layer. The joining and folding steps are repeated to form a cross-pleated cartridge with a stack or layered array of passageways between alternating two- and three-piece membrane layers. Seals can be applied to the edges and faces of cartridge as described above.

Figure 3A:
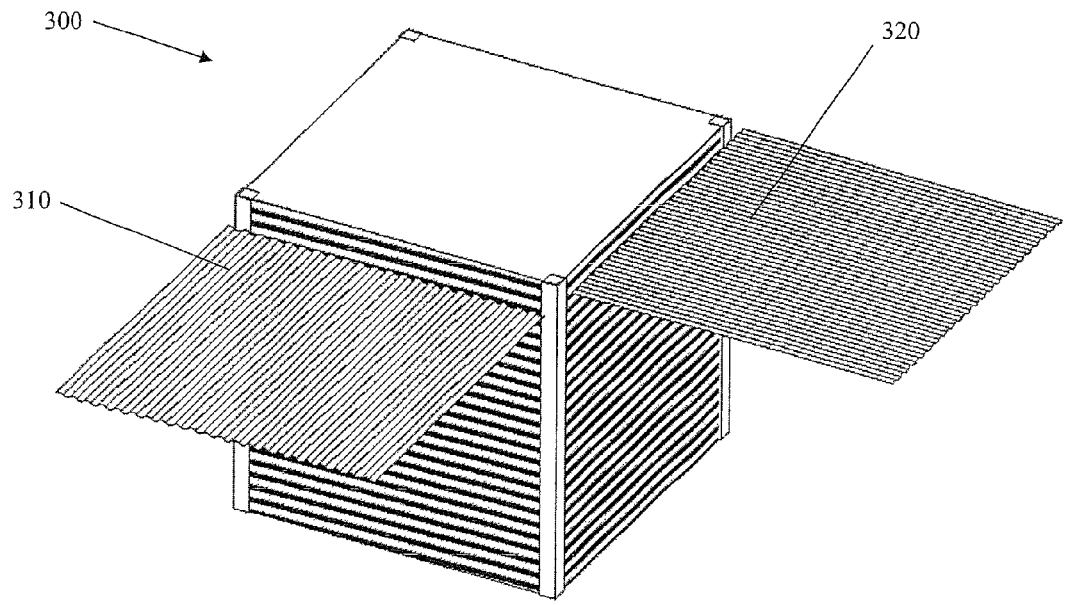
FIGS. 3a-b show embodiments of cross-pleated cartridges with separators that are used for improved flow distribution. Specifically.
Figure 3B:
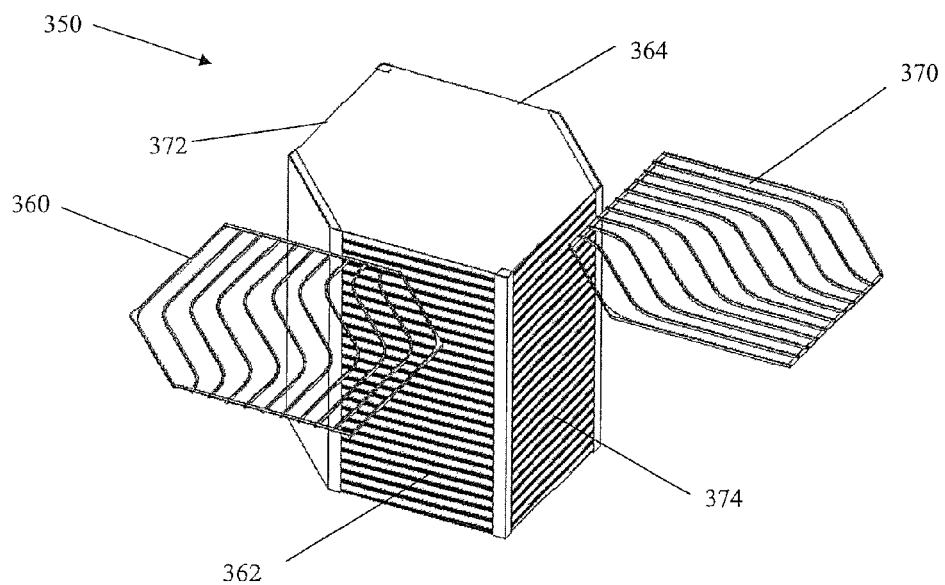

Cross-pleated cartridges of the type described herein can further comprise separators positioned between the membrane layers, for example, to assist with fluid flow distribution and/or to help maintain separation of the layers. For example mesh inserts, corrugated aluminum inserts, or plastic moulded inserts (as described in published U.S. Patent Application No. 2008/0085437 entitled "Pleated Heat and Humidity Exchanger with Flow Field Elements", which is hereby incorporated by reference in its entirety) can be disposed in some of all the passageways between adjacent membrane layers. FIG. 3a shows a square cross-flow cartridge 300 with corrugated aluminum foil separators inserted between each membrane layer, with two of the separators 310 and 320 shown pulled out of adjacently layered passageways. The separators are oriented so that the corrugated channels are parallel to the flow direction through the passageway into which they are inserted, with adjacent separators 310 and 320 oriented at 90° to each other, to provide a cross-flow configuration. FIG. 3b shows a hexagonal cartridge 350 with plastic molded separators inserted between each membrane layer, with two of the separators 360 and 370 shown pulled out of adjacently layered passageways. Separators 360 and 370 are substantially the same as one another, with S-shaped flow channels, but are oriented at 180° to one another to provide a partially counter-flow configuration. For example, a first fluid could be supplied to face 362 of cartridge 350, and would be directed through alternately layered passageways of the cartridge by a separator 360, and then exit the cartridge at opposing face 364. A second fluid could be supplied to face 372 of cartridge 350, and would be directed through the other passageways of the cartridge by a separator 370, and then exit the cartridge at opposing face 374. In the central region of the layers, the first and second fluids would thus be in a counter-flow configuration. With the same arrangement of separators, the fluids could be supplied so that in the central region the fluids would be in a co-flow configuration, for example by supplying the first fluid to face 362 and the second fluid to face 374. Different separator designs can be used for the alternate layers, or at different locations in the cartridges—they need not all be the same.

Separators may be inserted between the membrane layers after the cartridge is formed or may be inserted during the cross-pleating process, for example, between the steps shown in FIG. 1b and FIG. 1c described above.

Cross-pleated cartridges of the type described herein can be initially formed as square-base cartridges. As described in reference to FIG. 3b, such cartridges can be trimmed to form a hexagonal cartridge which can be configured with a counter-flow region. Counter-flow of the fluids is generally preferred over cross-flow configurations for ERV applications and certain other applications. The flow configuration and operational properties of a hexagonal counter-flow cartridge can be adjusted by varying the depth of removal and angle of trim.

Figure 4A:
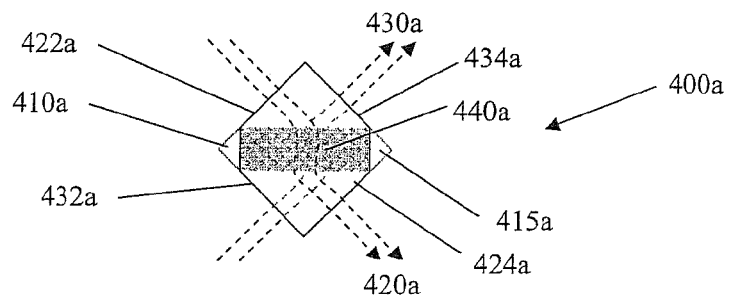
FIGS. 4a-d are schematic plan views showing examples of four different hexagonal cross-pleat trim profiles and examples of flow patterns and counter-flow regions that can be achieved within a cross-pleated cartridge.

FIGS. 4a-d are schematic plan views showing examples of four different hexagonal cross-pleat trim profiles and examples of flow patterns and counter-flow regions that can be achieved within the cartridge. FIG. 4a shows an embodiment of a cartridge where equal area and parallel 45° vertical trim cuts are used to remove two triangular prisms 410a and 415a from a square-based cartridge to create a hexagonal cartridge 400a. The dashed pairs of arrows 420a and 430a in FIG. 4a indicate possible flow paths of two different fluid streams passing through alternating passageways of the cartridge. A first fluid is supplied to inlet face 422*a*, passes through the cartridge as indicated by arrows 420*a*, and exits via outlet face 424*a*. A second fluid is supplied to inlet face 432*a*, passes through the alternate passageways of the cartridge as indicated by arrows 430*a*, and exits via outlet face 434*a*. In shaded region 440*a* the flow paths are essentially counter-flow to one another.

Figure 4B:
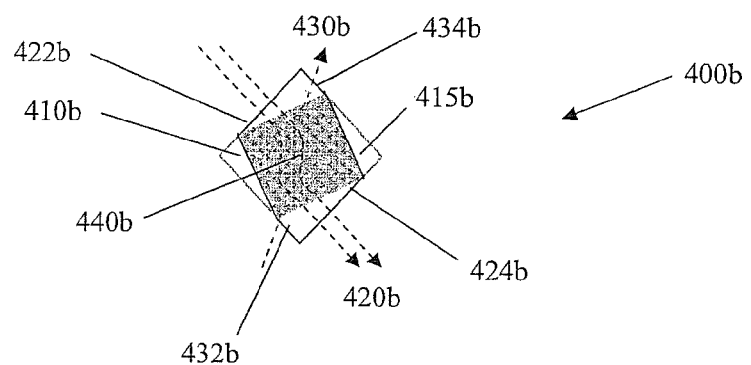

FIG. 4*b* shows an embodiment of a cartridge where equal area and parallel obtuse angel trim cuts are used to remove two triangular prisms 410*b* and 415*b* from a square-based cartridge to create a hexagonal cartridge 400*b*. The dashed arrows 420*b* and 430*b* in FIG. 4*b* indicate possible flow paths of two different fluid streams passing through alternate passageways of the cartridge. A first fluid is supplied to inlet face 422*b*, passes through the cartridge as indicated by arrows 420*b*, and exits via outlet face 424*b*. A second fluid is supplied to inlet face 432*b*, passes through the alternate layers of the cartridge as indicated by arrow 430*b*, and exits via outlet face 434*b*. In shaded region 440*b* the flow paths are essentially counter-flow to one another. By adjusting the trim angle, the area of counter-flow region 440*b* is increased (relative to 440*a* in FIG. 4*a*) but the area of inlet and outlet faces for the second fluid stream (432*b* and 434*b*) is considerably smaller than for the first fluid stream (faces 432*b* and 434*b*) as shown in FIG. 4*b*. This profile and flow configuration could be useful for applications that benefit from a large counter-flow region or having the velocity of one of the streams be reduced within the cartridge. The alternate passageways may be of difference pitch (or height) thereby further modifying the flow velocity within this arrangement.

Figure 4C:
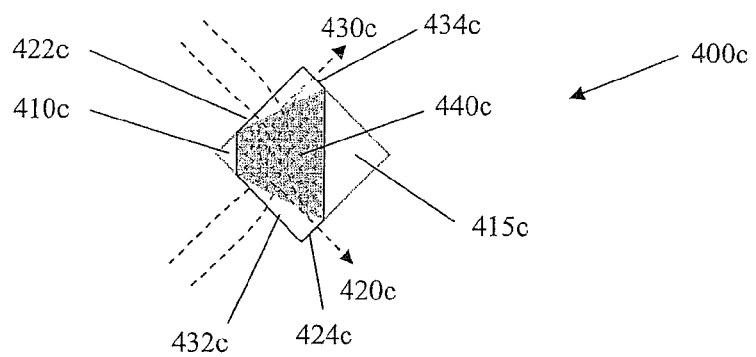
Figure 4D:
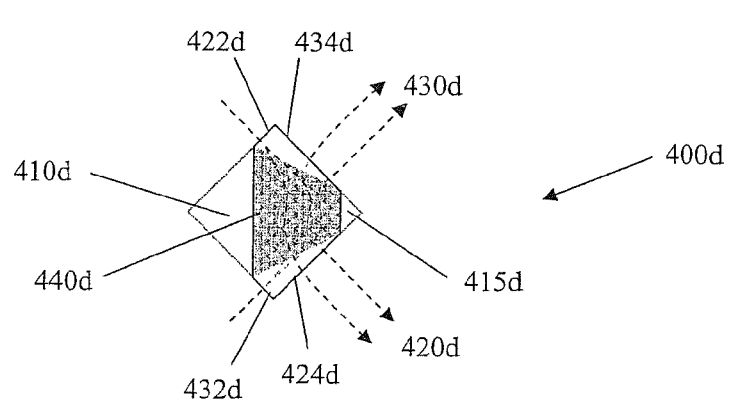

FIGS. 4*c* and 4*d* show embodiments of a cartridge where unequal area parallel 45° trim cuts are used create a large counter-flow region, but where the area of inlet faces is different from the area of the outlet faces for both fluids. These characteristics may be advantageous in some applications, where the resultant variation in fluid flow properties, velocities, mixing effects, pressure gradients, and/or temperature gradients within the layers can provide beneficial effects.

In FIG. 4*c* two unequally sized triangular prisms 410*c* and 415*c* are removed from a square-based cartridge to create a hexagonal cartridge 400*c*. A first fluid is supplied to inlet face 422*c*, passes through the cartridge as indicated by split arrow 420*c*, and exits via a smaller outlet face 424*c*. A second fluid is supplied to inlet face 432*c*, passes through the cartridge as indicated by split arrows 430, and exits via a smaller outlet face 434*c*. In shaded region 440*c*, which occupies a large proportion of the area of each layer, the flow paths are essentially counter-flow to one another. In FIG. 4*d*, again two unequally sized triangular prisms 410*d* and 415*d* are removed from a square-based cartridge to create a hexagonal cartridge 400*d*. A first fluid is supplied to inlet face 422*d*, passes through the cartridge as indicated by split arrow 420*d*, and exits via a larger outlet face 424*d*. A second fluid is supplied to inlet face 432*d*, passes through the cartridge as indicated by split arrow 430*d*, and exits via a larger outlet face 434*d*. Again, shaded counter-flow region 440*d* occupies a large proportion of the area of each layer.

The membrane material used in cross-pleated cartridges of the type described herein can be selected to have suitable properties for the particular end-use application. Preferably the membrane is pliable or flexible mechanically such that it can be folded as described herein without splitting. The cross-pleat process compounds two folds in one area, which focuses the stress of the fold in the corners of the cartridge layers. Preferably the membrane will also form and hold a crease when it is folded, rather than tending to unfold and open up again.

For ERV or other heat and water vapor exchanger applications, the membrane is water-permeable. In addition to more conventional water-permeable membranes, porous membranes with a thin film coating that substantially blocks gas flow across the membrane but allows water vapor exchange can be used. Also porous membranes that contain one or more hydrophilic additives or coatings can be used. Porous membranes with hydrophilic additives or coatings have desirable properties for use in heat and water vapor exchangers generally, and in particular for use in heat and water vapor exchangers with a cross-pleated membrane cartridge. Examples of porous membranes with hydrophilic additives include silica-filled polyethylene (PE) from Entek, Daramic or NSG; silica-filled PVC from Amersil; silica-filled PEEK from SiM; and PFSA (perfluorosulfonic acid) coated composite membranes from Fumatech. These types of membranes have favourable heat and water vapor transfer properties, are inexpensive, mechanically strong, dimensionally stable, easy to pleat, are bondable to gasket materials such as polyurethane, are resistant to cold climate conditions, and have low permeability to gas cross-over when wet or dry. The ratio of hydrophilic additive to polymer is important. There needs to be enough additive to allow water transfer but also adequate polymer to provide the membrane with strength and durability. For ERV applications, porous membranes with hydrophilic additives have been found to offer advantages over conventional ERV membrane materials even in conventional membrane plate-type designs. Testing of membrane samples and ERV cores has revealed that porous membranes with hydrophilic additives generally provide better heat and water vapor transfer. They are also more durable than desiccant-coated paper-based membranes that are commonly used in ERV applications, particularly when exposed to high levels of condensation (high saturation) and under freeze-thaw conditions.

Asymmetric membranes that have different properties on each surface can be used. If the two asymmetric membrane strips are oriented the same way up in the manufacturing process, one set of passageways in the finished cross-pleated cartridge will have different properties than the alternating set of passageways. For example, the membrane strips could be coated or laminated on one side so that the passageways for just one of the two fluid streams are lined by the coating or laminate.

Figure 5A:
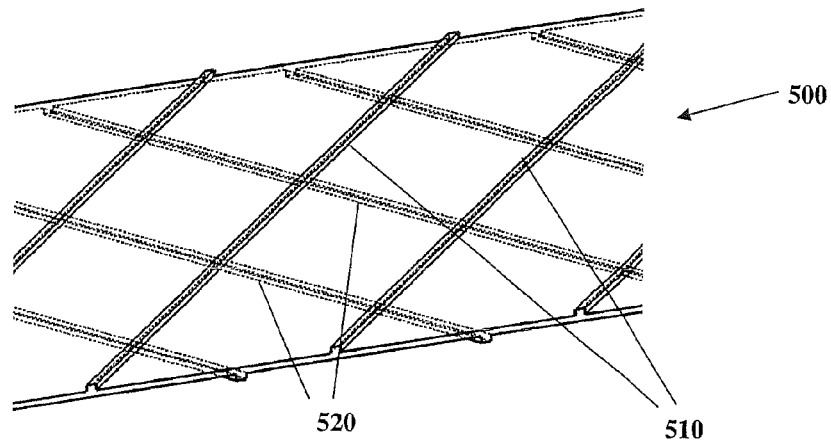
FIGS. 5a-c show three different embodiments of a membrane that has features formed on one or both surfaces. Specifically.
Figure 5B:
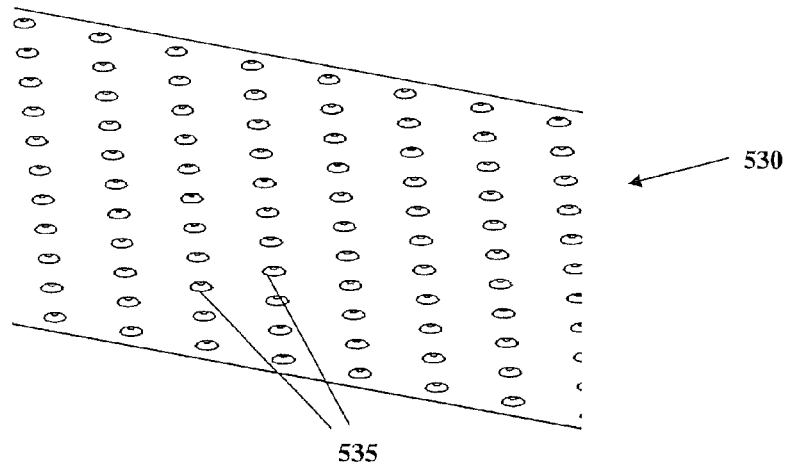
Figure 5C:
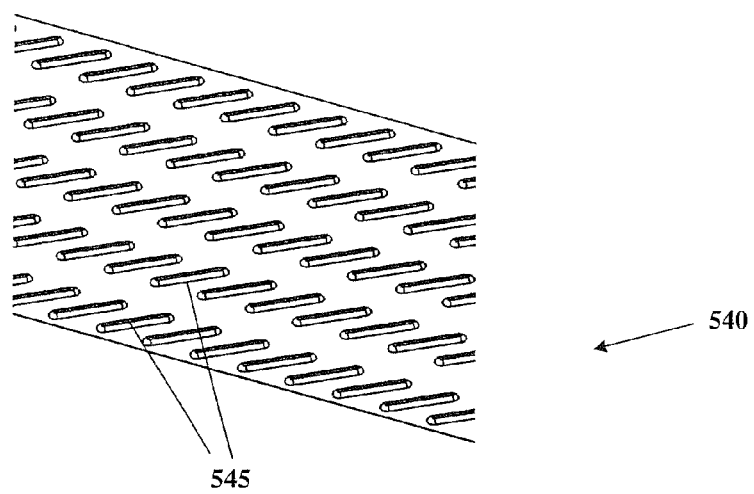

External profiles or features can be added to or incorporated into the membrane to enhance fluid distribution between the layers and/or to help maintain separation of the layers. FIGS. 5*a-c* show three different embodiments of membranes that have features formed on one or both surfaces. Specifically, FIG. 5*a* illustrates a membrane 500 that has diagonal ribbing on both sides. Ribs 510 on the top surface of membrane are oriented at 45° to the edges of the membrane strip and at 90° to ribs 520 that are on the underside of the membrane. With the ribs oriented in this way, when a cross-pleated membrane is fruited by the cross-pleating process described herein, the ribs will be oriented parallel to the folds in the membrane, so that the ribs in one layer are oriented perpendicular to the ribs in the adjacent layer, providing a cross-flow configuration. FIG. 5*b* illustrates a membrane 530 that has polka dot protrusions 535 on both surfaces in a regular grid pattern. FIG. 5*c* illustrates a membrane 540 that has elongated protrusions 445 on one surface. In the illustrated embodiment the protrusions are oriented at 45° to the edges of the membrane strip, so that in a cross-pleated cartridge they will be oriented in the primary flow direction, again parallel to the folds in the membrane. If the membrane has features on only one surface, as in this example, then only alternate passageways in the finished cartridge will have the featured membrane surface. Ribs or other protrusions or features can be molded, embossed or otherwise formed integrally with the membrane material, or can be added to the membrane afterwards, for example by a deposition or lamination process. Such "featured" membranes can be used in cross-pleated cartridges of the type described herein with or without the use of additional separators.

Cross-pleated cartridges of the type described herein can comprise more than one type of membrane. For example, in some embodiments, instead of using two strips or reels of membrane that are essentially the same, two different types of membrane can be used. This will result in a cross-pleated cartridge where each layer comprises two different membrane types.

A cross-pleating process of the type described in reference to FIGS. 1a-f can be performed manually or can be partially or fully automated for volume manufacturing.

Figure 6A:
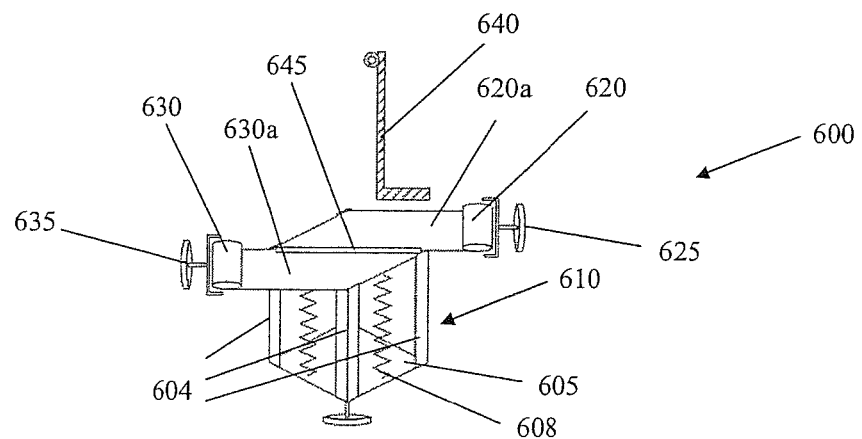
FIGS. 6a-f are simplified schematic operational diagrams illustrating manufacturing equipment that can be used to make a cartridge using the present cross-pleating technique in a partially-automated process, and showing the steps in the process.
Figure 6B:
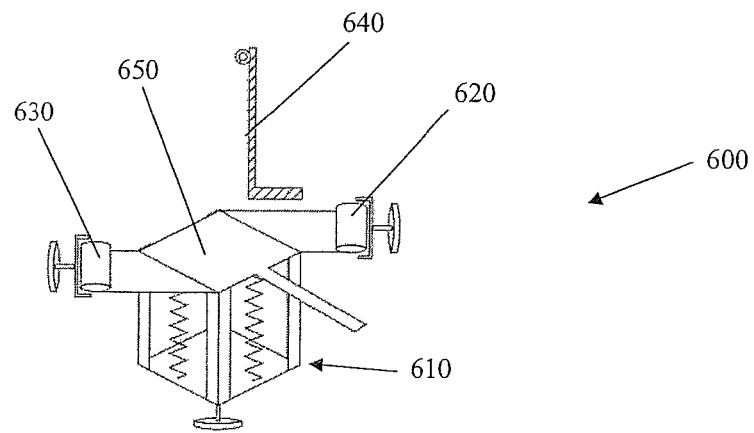
Figure 6C:
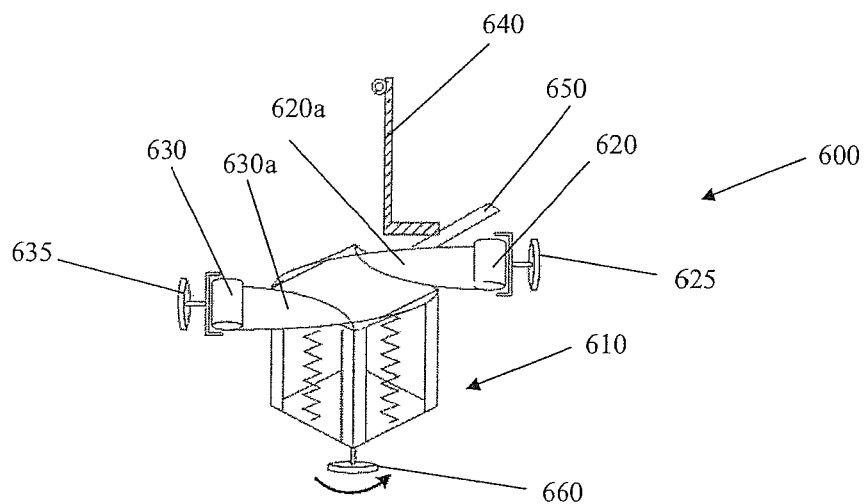
Figure 6D:
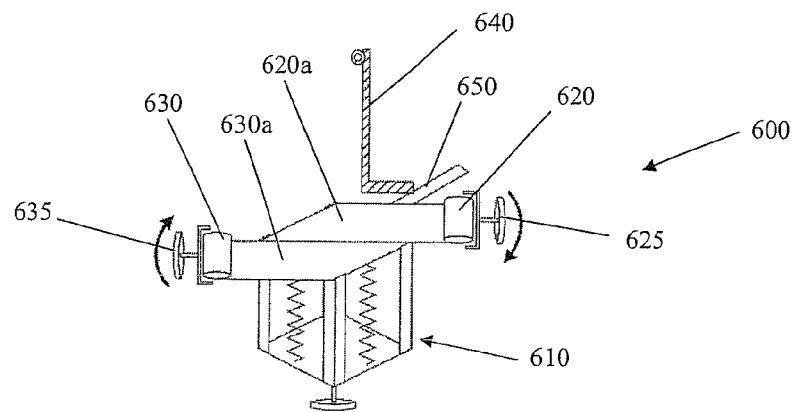
Figure 6E:
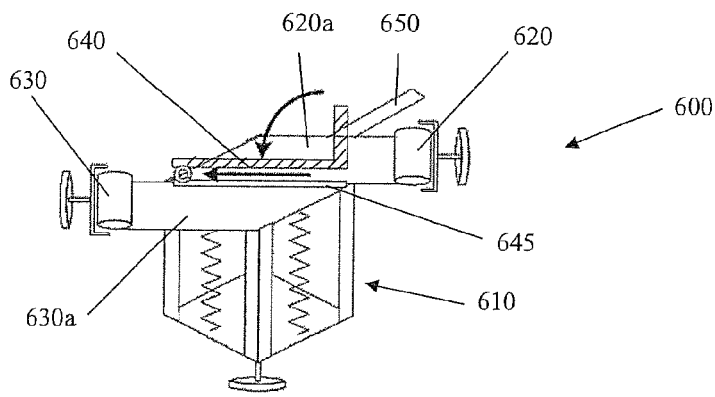
Figure 6F:
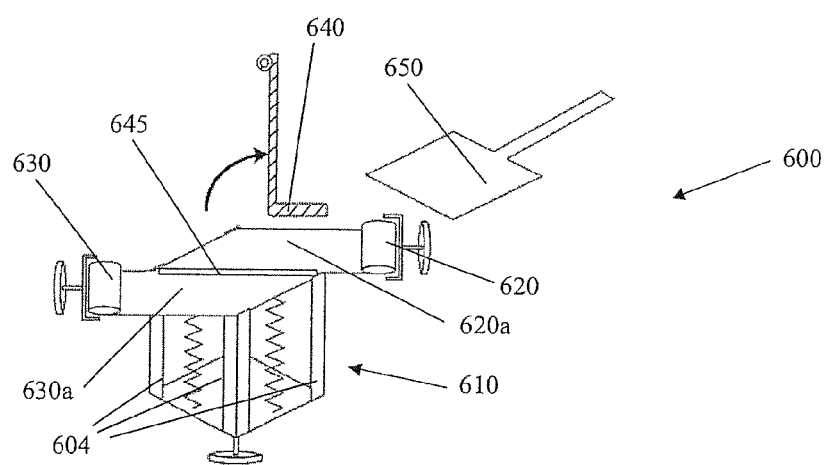

FIGS. 6a-f are a series of simplified schematic diagrams that illustrate an embodiment of a manufacturing equipment assembly 600 that can be used to make a cross-pleated cartridge using the present cross-pleating technique in a partially automated process, and that illustrate steps in the manufacturing process. Manufacturing equipment assembly 600 comprises a rotatable frame 610 comprising a base plate 605, four corner columns 604 (three are visible in FIGS. 6a-f), an upper rigid platform (not visible), and a spring or threaded rod mechanism 608 that maintains the working level (the height at which membrane folding occurs) at a substantially constant level. Two rolls of membrane 620 and 630 are located on rotating spools 625 and 635 respectively. Tape bonding mechanism 640 is located above frame 610. In the step illustrated in FIG. 6a, two strips of membrane 620a and 630a have been drawn in opposite directions from reels 620 and 630 respectively, arranged edge-to-edge in the same plane on the upper platform of frame 610, and joined along the diagonal seam by adhesive tape 645 to form a layer of the cartridge. FIG. 6b shows a folding plate 650 placed on the cartridge layer. Folding plate 650 can be used to help create uniform and parallel folds in the membrane strips. In the step illustrated in FIG. 6c frame 610, along with folding plate 650 and the partially completed cartridge, is rotated 90° on a bearing or spindle 660 in the direction of the arrow. This starts to twist the membrane strips 620a and 630a as shown. The two membrane reels 620 and 630 are then rotated 180° in opposite directions by rotation of spools 625 and 635 as shown in FIG. 6d. Thus, two strips of membrane 620a and 630a are again drawn in opposite directions from reels 620 and 630, and are each folded over folding plate 650 to give a sharp crease, so that they are arranged edge-to-edge with the resultant diagonal seam at 90° to the seam in the previous layer. The membrane spool and frame rotation mechanisms can be linked at a 2:1 ratio to operate simultaneously rather than in sequence. FIG. 6e shows the tape bonding mechanism 640 lowered so that a piece of tape 645 is applied along the seam joining the two strips of membrane 620a and 630a. Tape bonding mechanism 640 then retracts and folding plate 650 is withdrawn as shown in FIG. 6F These steps are repeated until the cartridge has the desired number of layers. As the cartridge is formed the upper platform moves down and the cartridge is contained within frame 610 with the folded layers held in alignment by the four corner columns 604. Because of the rotation of the frame, at the time it is taped each diagonal seam is in the same orientation relative to tape bonding mechanism 640, so mechanism 640 does not need to rotate. Cartridges can be made with a very large number of layers and then be cut to smaller individual cartridge heights (with fewer layers) thereby providing a more continuous process.

Other embodiments of similar manufacturing equipment have been developed to accomplish the same result. For example, by constraining the frame to not rotate, and having the membrane spools rotate about the frame in 90° increments on an overhead gantry, a cross-pleating process similar to that described above can be performed.

Figure 7:
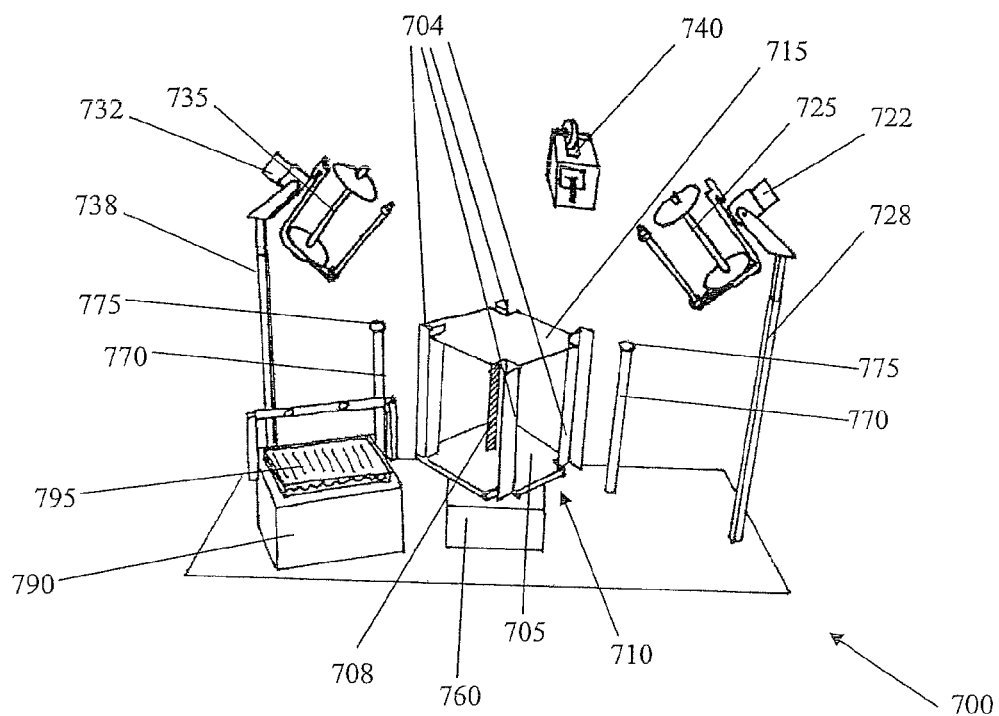
FIG. 7 shows another embodiment of manufacturing equipment that can be used to make a cartridge using the present cross-pleating technique in a partially-automated process.

FIG. 7 shows another embodiment of a manufacturing equipment assembly 700 that can be used to make a cartridge using the present cross-pleating technique in a partially automated process. Manufacturing equipment assembly 700 comprises a rotatable frame 710 comprising a base plate 705, four corner columns 704, an upper rigid platform 715, and a threaded rod mechanism 708 that maintains the working level at a substantially constant level. Rotatable spools 725 and 735 hold the two reels of membrane and are positioned above and on either side of frame 710. Spools 725 and 735 are mounted on stands 728 and 738, and are connected to be rotated via actuation of motors 722 and 732, respectively. After each folding step, frame 710 is rotated 90° on a bearing or spindle in housing 760, and spools 725 and 735 rotate 180° in opposite directions. Platform 715 is a height-adjustable working platform that moves via threaded rod 708 and is height-adjusted based on the number of turns of frame 710 during the pleating process. The thread pitch is tuned to accommodate four layers of height per revolution, since frame 710 only turns 90° per cartridge layer. Automatic tape dispenser 740 is conveniently located above frame 710, and can be configured to dispense the correct length of tape with each rotation of frame 710. A pick-and-place device, such as separator picker 790, can be configured to automatically issue a separator 795 to the operator for placement between the folded layers of the cartridge. A vacuum fixture can be used to apply a partial vacuum to hold the membrane strips down on either side of platform 715 during the taping process of each layer, in order to assist the operator in maintaining a straight and parallel seam to adhere during that step. For example, a pair of vacuum cups 775 can be mounted at the working level on steel tubes 770, and connected to a vacuum pump (not shown).

Embodiments of the manufacturing equipment described herein can be adapted to allow for fully automated production of cross-pleated membrane cartridges.

As can be seen from FIGS. 1a-f, there is very little membrane wastage in the cross-pleating technique. Almost all of the membrane is used, except for the triangular pieces that are trimmed from the first and last layer of each cartridge. Also, in the finished cartridge almost the entire membrane surface is accessible to the fluids that are directed through the cartridge and available to provide the desired fluid and/or heat transport.

The present cross-pleated membrane cartridge can be used in various types of heat and water vapor exchangers. For example, as mentioned above, the present cross-pleated membrane cartridges can be used as the core in energy recovery ventilators (ERVs) for transferring heat and water vapor between air streams entering and exiting a building. This is accomplished by flowing the streams on opposite sides of the cross-pleated membrane cartridge. The membrane allows the heat and moisture to transfer from one stream to the other while substantially preventing the air streams from mixing or crossing over.

Figure 8:
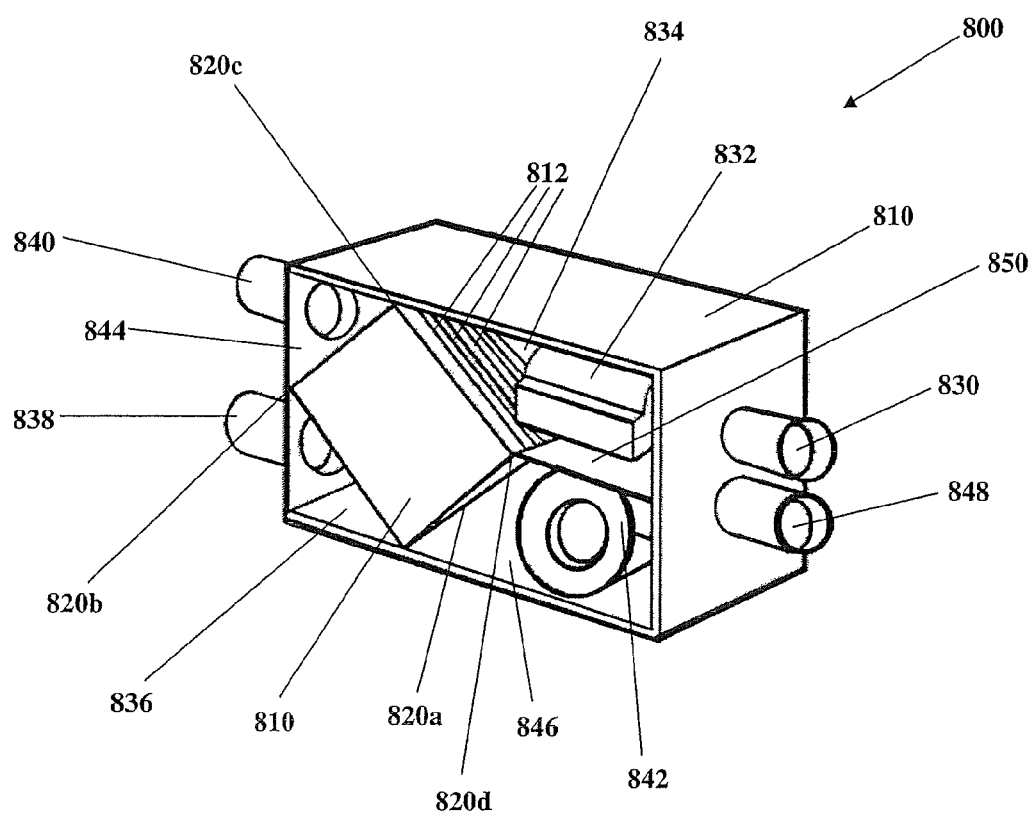
FIG. 8 shows an embodiment of a heat and humidity exchanger, such as an ERV, comprising a cross-pleated cartridge disposed in a housing.

FIG. 8 is a simplified isometric view of an embodiment of a heat and humidity exchanger 800, such as an ERV, with a cross-pleated membrane cartridge 810 disposed within a housing 815 (illustrated with one side removed to reveal cross-pleated cartridge 810). Cross-pleated cartridge 810 comprises a layered array of alternating first and second fluid passageways oriented at 90° to each other, separated by layers of a water-permeable membrane material. Cross-pleated cartridge 810 comprises four seals 820a, 820b, 820c and 820d, formed along the four layered-edges of the cartridges (extending horizontally in the illustrated view). These can be formed by potting the layered-edges of the cartridge as described above. Seals 820a, 820b and 820c form a seal against the inner walls of housing 815 to form separate fluid chambers; for example, the seals can cooperate with flanges, grooves or other features on the inside walls of housing 815. Seal 820d fowls a seal against sealing plate 850.

Housing 815 comprises first inlet port 830, connected to a fan 832 which directs a first fluid stream into chamber 834, through one set of passageways in cartridge 810, into chamber 836 and out via first outlet port 838. Housing 815 also comprises second inlet port 840, connected to a fan 842 which draws a second fluid stream into chamber 844, through the alternately layered passageways in cartridge 810 (in a cross-flow configuration with the first fluid) into chamber 846 and then out via second outlet port 848. Sealing plate 850 extends between fans 832 and 842 to seal first inlet chamber 832 from second outlet chamber 848. Additional gaskets or seals can be disposed against the interior of the housing between the inlet and outlet ports to prevent short-circuiting of the fluids between where the cross-pleated cartridge and the housing meet. In an ERV, warm and moist exhaust air could be directed to the outside from inside a building via ports 830 and 838. A cool and drier air supply stream could be directed into the building from the outside via ports 840 and 848. Water vapor and heat could be transferred from the outgoing stream to the incoming stream as the streams flow through cross-pleated cartridge 810 in a cross-flow arrangement, as shown.

Figure 9:
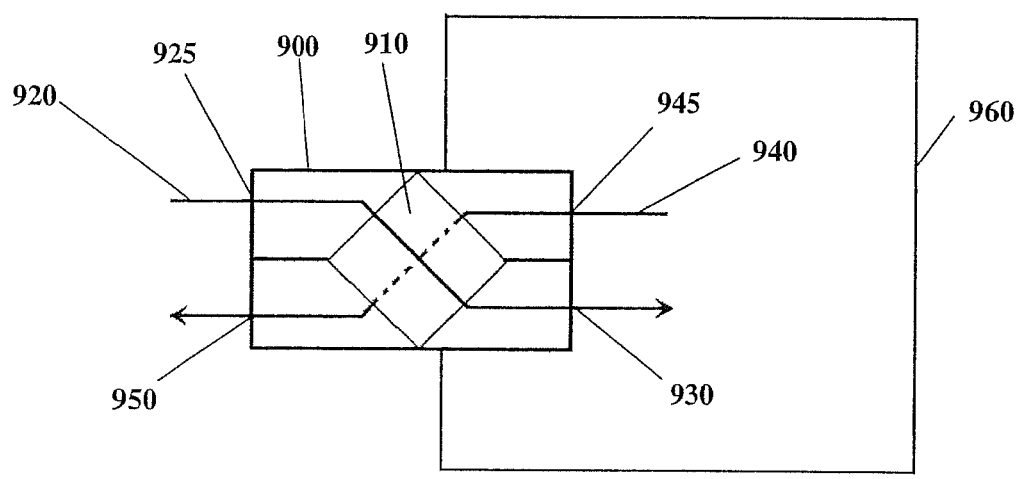
FIG. 9 is a simplified schematic diagram illustrating an embodiment of an ERV for transferring heat and water vapor between air streams entering and exiting a building.

FIG. 9 is a simplified schematic diagram of an ERV 900 for transferring heat and water vapor between air streams entering and exiting a building 960. ERVs typically include pumps or fans to move the air streams, ducting, as well as filters, control electronics and other components that are not shown in FIG. 9. Intake air stream 920 enters building 960 from the outside via an air intake port 925. The intake air passes through ERV 900 on one side of a cross-pleated membrane core 910 of the type described herein, and is directed into the building (for example, into the heating and or ventilation system) via port 930. The outgoing air stream 940 from building 960 is directed into ERV 900 via port 945. It passes on the opposite side of the cross-pleated membrane core 910 and exits the building at exhaust port 950. Heat and water vapor is transferred across the cross-pleated membrane core 910 between the intake air stream 920 and the exhaust air stream 940. For example, depending on the external environment, the exhaust air from the building can be used to cool and dehumidify warmer air being brought into building, or the exhaust air can be used to heat and humidify the intake air.

Other potential applications for the cross-pleated cartridges of the type described herein include, but are not limited to:

1) Fuel cell humidifiers where the cross-pleated cartridge comprises a water-permeable membrane material. For this application the humidifier can be configured with a cross or counter-flow arrangement to effect heat and water vapor transfer from and/to a fuel cell reactant or product stream. For example, it can be used to recycle the heat and water vapor from the exhaust stream of an operating fuel cell transferring latent and sensible energy from one stream to another.

2) Flue gas recapture or filter devices. Flue gas is an exhaust gas that exits to the atmosphere via a flue from a fireplace, oven, furnace, boiler, steam generator, power plant or other such source. Quite often, it refers to the combustion exhaust gas produced at power plants. A cross-pleated cartridge can be used to recapture or filter flue gases, water vapor and heat, with a high quality seal thereby limiting mass gas leakage.

3) Sequestering (carbon). A cross-pleated cartridge can comprise a layer of sequestering material, for example, in alternate membrane layers to transfer, absorb or trap heat, water vapor, materials or contaminants 4) Dryers where a cross-pleated cartridge is used in drying of gases by transfer of water from one stream to another through a water-permeable membrane.

5) Gas/liquid separators where the cross-pleated cartridge comprises a membrane material that promotes the selective transfer of particular gases or liquids.

6) Gas filtering, again where the cross-pleated cartridge comprises a membrane material that promotes the selective transfer of particular gas, and can be used to separate that gas from other components.

Other membrane materials (thin sheets or films) besides selectively permeable membrane materials could be pleated to form cartridges, using the cross-pleating technique described herein, for a variety of different applications. For example pliable metal or foil sheets could be used for heat exchangers, and porous sheet materials could be used for other applications such as filters.

The preferred orientation of the cartridge will depend upon the particular end-use application. For example, in many applications a sideways orientation with vertically oriented passageways may be preferred (for example, to facilitate drainage); in other applications it may be desirable to have the passageways layered in a vertical stack; or functionally it may not matter how the cartridge is oriented. More than one cartridge can be used in series or in parallel, and multiple cartridges can be enclosed in a single housing, for example, stacked or side-by-side.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings

The invention claimed is:

1. A cross-pleated cartridge obtainable using a method for making a cross-pleated cartridge comprising a plurality of membrane layers, the method comprising;
   (a) positioning two strips of membrane, extending in substantially opposite directions, so that a portion of an edge of one membrane strip is adjacent to a portion of an edge of the other membrane strip, forming a first seam;
   (b) joining the adjacent edge portions of the membrane strips along the first seam to form a membrane layer;
   (c) making a 45° fold in each membrane strip towards and then overlaying the first seam, to form a second seam at 90° to the first seam;
   (d) joining the adjacent edge portions of the membrane strips along the second seam to form another membrane layer;
   (e) making a 45° fold in each membrane strip towards and then overlaying the second seam, to form another first seam at 90° to the second seam;
   (f) repeating steps (b) to (e), thereby forming a cross-pleated cartridge with a stacked array of passageways between the membrane layers.

2. A cross-pleated cartridge comprising at least two strips of membrane folded to form multiple layers defining a stack of fluid passageways, wherein each layer comprises a portion of each of said at least two strips of membrane lying side-by-side in substantially the same plane and joined edge-to-edge by at least one seam.

3. The cross-pleated cartridge of claim 2 wherein each layer comprises a portion of each of two strips of membrane joined by a seam.

4. The cross-pleated cartridge of claim 3 wherein adjacent fluid passageways in the stack are oriented at 90° to one another.

5. The cross-pleated cartridge of claim 3 wherein each of the passageways comprises two parallel edges that are sealed by the folded membrane.

6. The cross-pleated cartridge of claim 3 wherein the seams in adjacent membrane layers of the cartridge are oriented at 90° to one another.

7. The cross-pleated cartridge of claim 3 wherein the membrane layers are substantially square, and each of the seams forms a diagonal of one of the square membrane layers.

8. The cross-pleated cartridge of claim 3 wherein the cross-pleated cartridge is a square-based rectangular prism.

9. The cross-pleated cartridge of claim 3 wherein each of the two membrane strips is of width W, and the seams are about 2 W in length and the area of each of the square membrane layers is about $2 W^2$.

10. The cross-pleated cartridge of claim 2 wherein in each layer of the cartridge, the portions of the membrane strips are positioned edge-edge so that they abut one another along the seams.

11. The cross-pleated cartridge of claim 2 wherein the portions of the membrane strips are joined by adhesive tape along the seams.

12. The cross-pleated cartridge of claim 2 wherein in each layer of the cartridge, the portions of the membrane strips are positioned so that they partially overlap along the seams.

13. The cross-pleated cartridge of claim 2 wherein the portions of the membrane strips are thermally bonded or vibration welded along the seams.

14. The cross-pleated cartridge of claim 2 wherein the portions of the membrane strips are adhesively bonded along the seams.

15. The cross-pleated cartridge of claim 2 wherein the cartridge has at least four layered-edges extending in the layered direction, and wherein the cartridge further comprises seals extending along the layered-edges.

16. The cross-pleated cartridge of claim 15 wherein the seals are formed by potting the layered-edges of the cartridge with a sealant material.

17. The cross-pleated cartridge of claim 2 further comprising separators disposed between at least some of the plurality of membrane layers.

18. The cross-pleated cartridge of claim 17 wherein the separators define a plurality of discrete fluid flow channels within the passageways.

19. The cross-pleated cartridge of claim 18 wherein the separators are selected from corrugated sheet materials, mesh materials, and molded plastic inserts.

20. The cross-pleated cartridge of claim 2 wherein the cartridge is a hexagonal prism.

21. The cross-pleated cartridge of claim 20 further comprising a separator disposed in each of the passageways.

22. The cross-pleated cartridge of claim 21 wherein the separators define a counter-flow or a co-flow region in adjacently layered passageways.

23. The cross-pleated cartridge of claim 22 wherein each of the separators defines a set of S-shaped flow channels in one of the passageways.

24. The cross-pleated cartridge of claim 20 where the cartridge has six layered-edges extending in the layered direction and six layered faces extending in the layered direction, and wherein the cartridge further comprises seals extending along the six layered-edges and across two of the six layered-faces of the cartridge.

25. The cross-pleated cartridge of claim 24 wherein the seals are formed by potting the layered-edges and layered-faces of the cartridge with a sealant material.

26. The cross-pleated cartridge of claim 2 wherein each alternate layer comprises a portion of each of two strips of membrane joined by a seam, and each of the other alternate layers comprises a portion of the two strips of membrane each joined to a third strip of membrane by a seam.

27. The cross-pleated cartridge of claim 26 wherein the cartridge is a hexagonal prism.

28. The cross-pleated cartridge of claim 26 where the cartridge has six layered-edges extending in the layered direction and six layered faces extending in the layered direction, and wherein the cartridge further comprises seals extending along the six layered-edges and across two of the six layered-faces of the cartridge.

29. The cross-pleated cartridge of claim 2 wherein the membrane is a water-permeable membrane.

30. The cross-pleated cartridge of claim 2 wherein the membrane is an asymmetric membrane.

31. The cross-pleated cartridge of claim 2 where the membrane strips have surface features on at least one surface thereof.

32. The cross-pleated cartridge of claim 31 wherein the surface features comprise diagonal ribbing oriented at 45° to the edges of the membrane strips.

33. A heat and water vapor exchanger for transferring moisture between a first fluid stream and a second fluid stream, the exchanger comprising:
a housing with a first inlet port, a first outlet port, a second inlet port and a second outlet port; and
a cross-pleated cartridge enclosed within the housing, the cross-pleated cartridge comprising multiple layers of a folded water-permeable membrane material defining a stack of alternating first and second fluid passageways, wherein each layer comprises a portion of at least two strips of the water-permeable membrane material joined by at least on seam;
wherein the first fluid passageways fluidly connect the first inlet port to the first outlet port the second fluid passageways fluidly connect the second inlet port to the second outlet port.

34. The heat and water vapor exchanger of claim 33 wherein each layer comprises a portion of each of two strips of membrane joined by a seam.

35. A cross-pleated cartridge obtainable using a method for making a cross-pleated cartridge comprising a plurality of membrane layers, the method comprising:
(a) positioning two strips of membrane, extending in substantially opposite directions, so that a portion of an edge of one membrane strip is adjacent to a portion of an edge of the other membrane strip, forming a first seam;
(b) joining the adjacent edge portions of the two membrane strips along the first seam to form a two-piece membrane layer;
(c) positioning a third strip of membrane across the two-piece membrane layer at 90° to the first seam;

(d) making a 45° fold in each of the two membrane strips towards and then overlaying the first seam, so that a portion of an edge of each of the two membrane strips is adjacent to a portion of opposite edges of the third membrane strip, to form a pair of second seams at 90° to the first seam;

(e) joining the adjacent edge portions of the two membrane strips to the third membrane strip along the second seams to form three-piece membrane layer;

(f) making a 45° fold in each of the two membrane strip towards and then overlaying the second seams, to form another first seam at 90° to the second seams;

(g) repeating steps (b) to (f), thereby forming a cross-pleated cartridge with a stacked array of passageways between alternating two-piece and three-piece membrane layers.

* * * * *